June 19, 1956 J. L. JONES 2,751,583

SHUTTER FOR TELEVISION PICTURE TUBE

Filed March 2, 1954 2 Sheets-Sheet 1

Jerome L. Jones
INVENTOR.

BY Clarence A. O'Brien
and Harvey B. Jacobson
Attorneys

June 19, 1956 J. L. JONES 2,751,583

SHUTTER FOR TELEVISION PICTURE TUBE

Filed March 2, 1954 2 Sheets-Sheet 2

Jerome L. Jones
INVENTOR.

BY Clarence A. O'Brien
and Harvey B. Jacobson
Attorneys 2,751,583
Patented June 19, 1956

2,751,583

SHUTTER FOR TELEVISION PICTURE TUBE

Jerome L. Jones, Temple, Tex.

Application March 2, 1954, Serial No. 413,521
1 Claim. (Cl. 340—367)

This invention relates to an attachment for a television set or the like and has for its primary object the provision of means for closing a portion of the front opening of the television set with an opaque shutter.

The construction of this invention features a shutter adapted to be raised and lowered into and from an auxiliary opening formed in the television set through which a daily program log, advertisements, news flashes and other announcements can be telecast so that even though this auxiliary opening is provided, it can be rendered selectively inactive and inoperative.

Incorporated in the invention is an opaque shutter which may be raised or lowered, using a novel gearing arrangement.

A further object of this invention resides in the provision of means whereby a television log of daily programs, suitable advertising, news flashes, and other announcements can be telecast, yet which may be selectively prevented from interrupting the enjoyment of a person being entertained by the television program then being telecast.

Still further objects of this invention reside in the provision of a television attachment that is simple in construction and installation, capable of being readily utilized with various existing makes and models of television sets, yet which is readily adaptable for new construction, and which is inexpensive to install.

These, together with the various ancillary objects and features of the invention which will become apparent as the following description proceeds, are attained by this device, preferred embodiments of which have been illustrated in the accompanying drawings, by way of example only, wherein.

Figures 1, 2, 3:
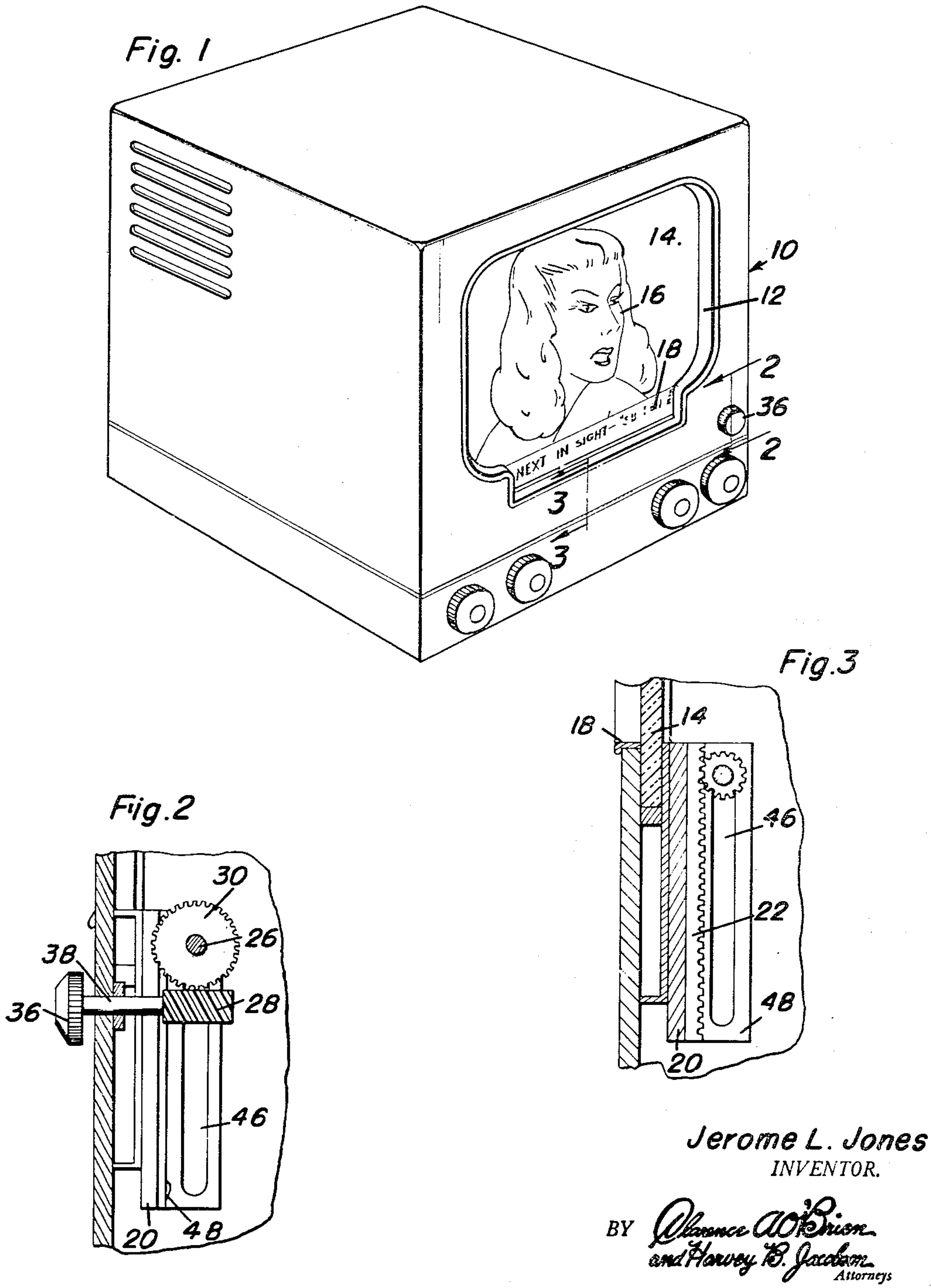
Figure 1 is a perspective view of a television set having the device comprising the present invention operatively installed therein.
Figure 2 is a vertical sectional view as taken along the plane of line 2—2 in Figure 1 and being shown on an enlarged scale for greater clarity illustrating one form of means for actuating the shutter.
Figure 3 is an enlarged vertical sectional detail view as taken along the plane of line 3—3 in Figure 1.
Figure 4:
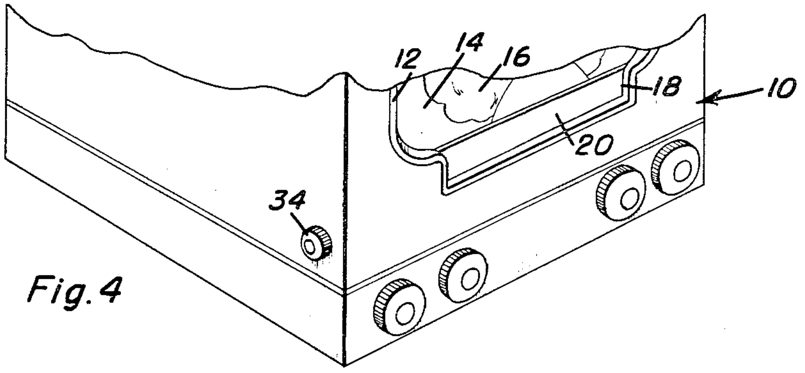
Figure 4 is a partial perspective view of a modified form of the invention as installed in a television set.
Figure 5:
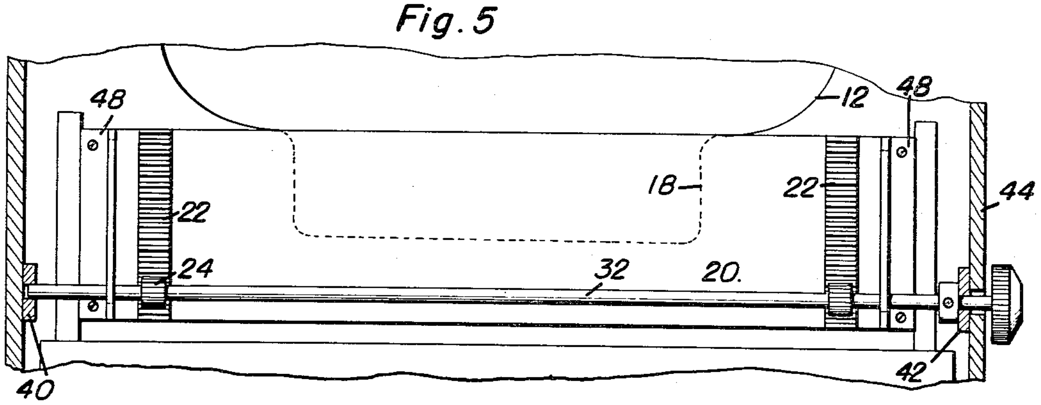
Figure 5 is an enlarged rear elevational view of the shutter and means for raising and lowering the shutter, with parts of the television set being shown in section for greater detail of the shutter.
Figure 6:
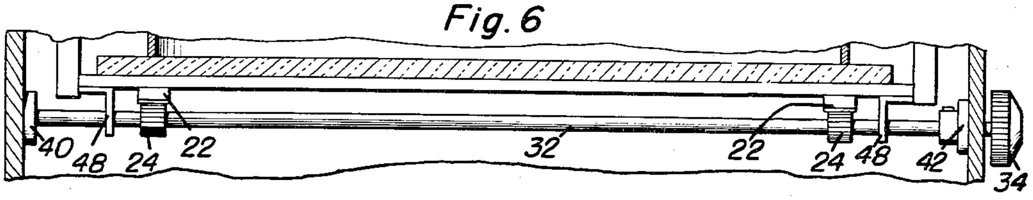
Figure 6 is a plan view of the apparatus shown in Figure 5.
Figure 7:
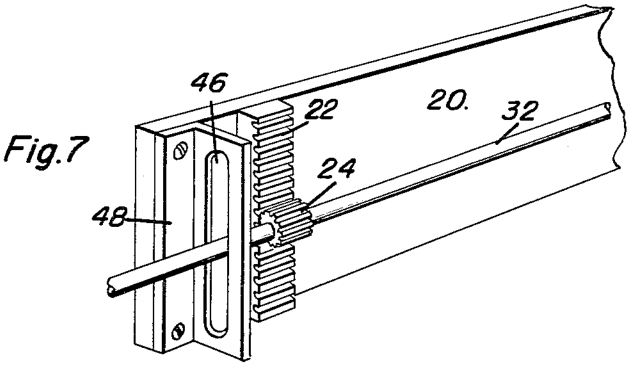
Figure 7 is a partial perspective view of the means for raising and lowering the shutter and of the bracket comprising one of the elements of the invention attached to the shutter.

With continuing reference to the accompanying drawings wherein like reference numerals designate similar parts throughout the various views, reference numeral 10 generally designates any conventional make or model of television set which may be provided with a suitable front opening 12 having a view plate 14 extending across the opening 12 and spaced from the front face of a cathode ray tube on which the image 16 has been received. The concept of the present invention resides in the provision of an auxiliary opening 18 forming a part of the front opening 12, the view plate 14 extending across the auxiliary opening 18. The picture tube of the television set 10 is adapted to receive a telecast daily program log, news flashes, advertising or the like simultaneous with the picture 16. However, it is realized that during certain programs, it may be desirable for the viewer to eliminate the subject matter being telecast and visible through the auxiliary opening 18, and therefore, a shutter 20 is provided. The shutter 20 may be formed from any suitable material, such as opaque glass, plastic or the like, and when in a raised position, completely closes the auxiliary opening 18.

The means provided for raising and lowering the shutter 20 include a pair of racks 22 which are rigidly secured to the shutter 20. The racks 22 are engaged by gears 24 mounted, as is shown in Figures 2 and 3, on a shaft 26 driven by means of a worm gear 28 which engages a pinion gear 30 also mounted on the shaft 26. Optionally, the gears 24 may be mounted on a shaft of the type shown in Figures 4 through 7 and designated by reference numeral 32 which is driven by means of a knob 34 on the side of the cabinet forming the casing of the television set 10. The worm gear 28 is driven by means of a knob 36 mounted on the front of the casing of the television set 10. The knob 36 is utilized for driving another shaft 38 connected to the worm gear 28. The shafts 26 and 32 may be suitably journaled as in bearings 40 and 42 within the casing 44 of the television set 10. The shafts 26 or 32 extend through elongated slots 46 formed in brackets 48 attached to the shutter 10, the brackets 48 being of substantially L-shape and acting as guides for the shafts 26 or 32. Hence, with the shutter 20 in a raised position, the program log or the like cannot be seen through the auxiliary opening 18, yet it is possible to lower the shutter 20 when desired so that the matter being telecast can be seen through the auxiliary opening 18.

Since from the foregoing, the construction and advantages of this television attachment are readily apparent, further description is believed to be unnecessary.

However, since numerous modifications will readily occur to those skilled in the art after a consideration of the foregoing specification and accompanying drawing, it is not intended to limit the invention to the precise embodiment shown and described, but all suitable modifications and equivalents may be readily resorted to which fall within the scope of the appended claim.

What is claimed as new is as follows:

In combination with a television set including a casing having a front opening and a view plate extending across the opening, an opaque shutter in said casing and means for raising and lowering said shutter into selective alignment with a portion of the opening, said means including a shaft journalled in opposite walls of said casing, a gear on said shaft at each end thereof, a rack attached to said shutter at each end thereof, said gears engaging corresponding racks, a pair of spaced guide brackets secured to said shutter, said brackets having elongated slots therein, said shaft extending through said slots, a pinion gear also mounted on said shaft, a worm gear for actuating said pinion gear, another shaft connected to the worm gear and a knob mounted on the casing on the end of said other shaft for driving said worm gear.

(References on following page)

References Cited in the file of this patent

UNITED STATES PATENTS

| | | |
|---|---|---|
| 3,354 | Phelps | Nov. 24, 1843 |
| 139,307 | Follett et al. | May 27, 1873 |
| 2,417,446 | Reynolds | Mar. 18, 1947 |
| 2,648,724 | Enslein | Aug. 11, 1953 |

FOREIGN PATENTS

| | | |
|---|---|---|
| 110,148 | Australia | Apr. 4, 1940 |
| 110,923 | Australia | July 11, 1940 |
| 111,286 | Australia | Aug. 26, 1940 |